3,043,603
HAND TRUCK WITH PIVOTED WHEEL SUPPORTS
Raymond J. Major, Sr., 646 Lowrey Ave., Troy, Mich.
Filed June 8, 1959, Ser. No. 818,786
1 Claim. (Cl. 280—40)

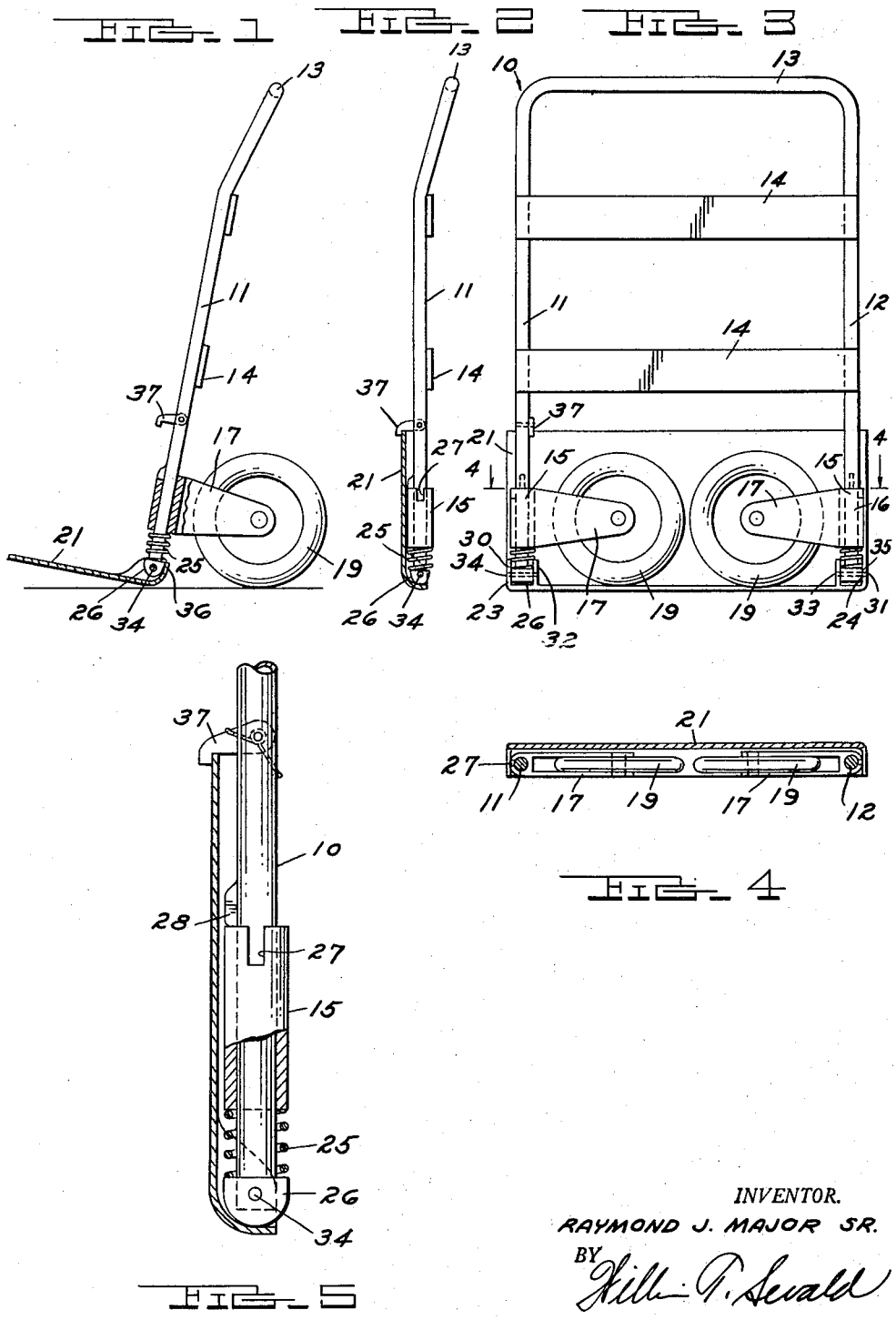
July 10, 1962 R. J. MAJOR, SR 3,043,603
HAND TRUCK WITH PIVOTED WHEEL SUPPORTS
Filed June 8, 1959
INVENTOR.
RAYMOND J. MAJOR SR.
ATTORNEY

This invention relates to a hand truck and more particularly pertains to one which is collapsible to a wheel and load platform folded position.

Hand trucks are well known for carrying loads, however, the several devices of the prior art have not proven entirely satisfactory inasmuch as they are complicated and bulky in design and construction, and cannot be easily folded to a flat storage position.

With the foregoing in view, the primary object of the invention is to provide a hand truck which is simple in design and construction, inexpensive to manufacture, easy to use, and easy to fold to a flat storage position.

An object of the invention is to provide rotatable wheel supporting sleeves which are angularly movable from an extended use position to a folded storage position.

An object of the invention is to provide parallel bars having dogs lying in notches of the sleeves holding the wheel supporting sleeves in the extended use position.

An object of the invention is to provide springs normally urging the sleeve notches into engagement with the dogs.

An object of the invention is to provide springs holding the dogs and notches in engagement with the sleeves being axially movable against the springs so as to disengage the dogs and notches to permit folding the wheels to the storage position.

An object of the invention is to provide a folding platform plate which is easily pivoted between its use and storage positions.

These and other objects of the invention will become apparent by reference to the following description of a folding hand truck embodying the invention taken in connection with the accompanying drawing in which:

FIG. 1 is a side elevational view of the inventive device in the use position, partly in cross section, showing the notch and dog engagement.

FIG. 2 is a side elevational view of the inventive hand truck in the folded position.

FIG. 3 is a rear elevational view of the device seen in FIG. 2.

FIG. 4 is a cross sectional view of FIG. 3 taken on the line 3—3 thereof; and

FIG. 5 is an enlarged partial view of the lower portion of the device as seen in FIG. 2.

Referring now to the drawing wherein like numerals refer to like and corresponding parts throughout the several views, the folding hand truck disclosed to illustrate the invention comprises an inverted U-shaped frame 10 having paired spaced parallel upwardly extending bars 11 and 12 each having upper ends interconnected by the handle-bar 13, intermediate portions interconnected by at least one load cross-strap 14, and sleeves 15 axially slidably and angularly rotatably disposed on the lower ends of the bars 11 and 12. The sleeves 15 have radially extending arms 17 which rotatably mount the wheels 19, and a platform plate 21 pivotally mounted at 23 and 24 at the lower ends of the bars 11 and 12 respectively.

More particularly the sleeves 15 are urged upwardly by the springs 25 which are abutted at their bottoms by the caps 26 so as to be confined between the sleeves 15 and the cap 26 urging the sleeve 15 upwardly with the notch 27 of the sleeve receiving the dog 28 on the rods 11 and 12 in the use position as seen in FIG. 1 so as to angularly project the arm 17 in the use position. The load and the frame 10 urges the dog 28 downwardly into the notch 27 and the supporting relationship of the wheel urges the sleeves 15 upwardly forcing the notch 27 into engagement with the dog 28 on both bars 11 and 12.

The sleeve 15 is manually depressible from the position seen in FIG. 1 to the position seen in the remaining figures by forcing the sleeve 15 downwardly against the spring 25 so as to move the notch 27 out of engagement with the dog 28 whereupon the sleeve 15 is angularly rotatable about the rods from the use position seen in FIG. 1 to the storage position illustrated in the other figures.

The platform plate 21 is equipped with paired side flanges 30 and 31 and paired intermediate flanges 32 and 33 and a pivot pin 34 and 35 is disposed between the legs 11 and 12 and the caps thereon and connected in the flanges thereby pivotally supporting the platform plate 21 with the back upwardly projecting flange 36 abutting the caps or the bars 11 and 12 preventing further downward pivotal movement from the position seen in FIG. 1 thereby supporting the plate in the use position shown. The plate is manually movable from the position of FIG. 1 to the position shown in FIG. 2 and a spring catch 37 is provided for engaging the plate to hold it in the parallel storage position.

In operation the operator takes the truck from storage in the condition illustrated in FIGS. 1 through 5 and releases the catch 37 whereupon the platform plate 21 drops via gravity and the user then swings the wheels 19 and 20 from the position seen in FIGS. 2 to 5 to that of FIG. 1 whereupon the spring 25 automatically moves the sleeves 15 upwardly engaging the notch 27 with the dog 28 so that the wheels are locked in the use position seen in FIG. 1 and the device is ready for use.

After the truck has been used, the operator merely elevates the wheels 19 and 20 from the ground by moving the handle to a position over the platform 21 whereupon he manually depresses the sleeves 15 moving their notches 27 out of engagement with the dogs 28 and then swings the wheels to the position shown in FIGS. 2 through 5; he then swings the platform 21 upwardly into engagement with the catch 37 whereupon the device is completely collapsed in its storage position.

The inventive folding hand truck with these features constitutes a compact, durable, and neat appearing, and easily storable and operable mechanism which is highly useful for transportation loads and which is easily moved between its use and storage positions.

Although but a single embodiment of the invention has been shown and described in detail, it is obvious that many changes may be made in the size, shape, detail and arrangement of the various elements of the invention within the scope of the appended claim.

I claim:

A folding hand truck comprising paired spaced parallel upwardly extending bars having upper ends, lower ends, and intermediate portions; a handle bar interconnecting said bars upper ends, at least one load cross-strap interconnecting said bars intermediate portions, sleeves axially slidably and rotatably disposed on said bars lower ends, dogs on said bars above said sleeves limiting said sleeves upward sliding limit, springs on said bars below and abutting said sleeves, caps on said bars lower ends below and abutting said springs; said sleeves having upper edges; said sleeve upper edges having notches therein receiving said dogs in normal position of use preventing relative rotational movement of said sleeves on said bars; said springs depressably urging said sleeves upwardly with their notches receiving said dogs angularly securing said sleeves relative to said bars; at least one arm extending radially from each said sleeve normally projecting in a plane transverse to the plane of said handle bar and strap, and wheels rotatably disposed on said arms; the downward force of the truck and a load thereon urging said dogs against said sleeves and into their notches; the supporting direction of said sleeves urging said sleeves against said dogs; said sleeves being manually axially slidable against said springs to move said sleeve notches out of engagement with and to a position below said dogs to permit relative rotational movement of said sleeves and said arms and wheels thereon relative to said bars to swing same to a folded position in a plane parallel to the plane of said handle bar and strap, said springs urging said sleeves upper edges in said folded position into contact with said dogs in the unnotched area of said sleeves upper edges above said sleeve upper edges notches; said sleeve upper edges riding said dogs in spring pressed relationship in the folded position so that upon said sleeves swinging with said wheels and arms to the normal position said notches automatically receiving said dogs under spring pressure and automatically locking on said dogs holding said sleeves, arms, and wheels, in the normal use position.

References Cited in the file of this patent

UNITED STATES PATENTS

| | | |
|---|---|---|
| D. 178,975 | Traut | Oct. 16, 1956 |
| 887,858 | Smith | May 19, 1908 |
| 1,111,663 | McGill | Sept. 22, 1914 |
| 1,409,838 | Emery et al. | Mar. 14, 1922 |
| 2,554,091 | Davis | May 22, 1951 |
| 2,646,241 | McLean | July 21, 1953 |
| 2,661,220 | Davis | Dec. 1, 1953 |
| 2,802,672 | Angelo | Aug. 13, 1957 |
| 2,939,364 | Doswell | June 7, 1960 |